United States Patent [19]

House et al.

[11] Patent Number: 4,663,201

[45] Date of Patent: May 5, 1987

[54] POLYUREA COATINGS FOR OBJECTS OF METAL GLASS WOOD OR PLASTIC

[75] Inventors: David W. House, Arlington Heights; Ray V. Scott, Jr., Addison, both of Ill.

[73] Assignee: UOP Inc., Des Plaines, Ill.

[21] Appl. No.: 855,991

[22] Filed: Apr. 25, 1986

[51] Int. Cl.$^4$ .............................................. B05D 3/02
[52] U.S. Cl. .............................. 427/388.2; 427/389.7; 427/393; 427/393.5
[58] Field of Search ................ 427/385.5, 388.1, 388.2, 427/389.7, 389.8, 393, 393.5

[56] References Cited

U.S. PATENT DOCUMENTS

| | | | |
|---|---|---|---|
| 3,367,920 | 2/1968 | Wasserman et al. | 427/385.5 X |
| 3,846,351 | 11/1974 | Huffaker et al. | 260/2.5 AM |
| 4,248,756 | 2/1981 | König et al. | 427/385.5 X |
| 4,410,597 | 10/1983 | Nishino et al. | 427/388.2 X |
| 4,524,104 | 6/1985 | Hagio et al. | 427/388.1 X |
| 4,581,433 | 4/1986 | Potter et al. | 427/385.5 |

OTHER PUBLICATIONS

R. Heath, Urethanes Technology, Mar. 1985, 17–20.

*Primary Examiner*—Thurman K. Page
*Attorney, Agent, or Firm*—Thomas K. McBride; John F. Spears, Jr.; Eugene I. Snyder

[57] ABSTRACT

The polyurea resulting from curing polyfunctional isocyanates having at least three groups with a N,N'-dialkylmethylenedianiline are broadly useful as coatings on the surface of objects made of metal, wood, glass, or plastic. Such coatings may be made based on either a 1-pack system or 2-pack system. The diamine N,N'-di(2-butyl)4,4'-methylenedianiline is a particularly useful diamine. Biurets are an especially desirable class of polyisocyanates for the polyureas of this invention.

27 Claims, No Drawings

POLYUREA COATINGS FOR OBJECTS OF METAL GLASS WOOD OR PLASTIC

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of cheap fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric compounds. A large class of such prepolymers are approximately 2:1 adducts of a diisocyanate, OCN—Y—NCO, and a diol. Another class of prepolymers, especially pertinent to this application, result from the reaction of diisocyanates with a limited amount of water to give as prepolymers principally biurets with smaller amounts of higher condensation products according to the reaction, $$OCN-Y-NCO + H_2O \longrightarrow OCN-Y-NH_2 + CO_2$$

$$OCN-Y-NH_2 + OCN-Y-NCO \longrightarrow$$

$$OCN-Y-NHCONH-Y-NCO + OCN-Y-NCO \longrightarrow$$

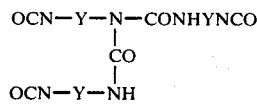

Although Y is susceptible of great variety, usually being a divalent alkyl, cyclohexyl, or aromatic radical, in fact the most available urethane prepolymers are made from toluene-2,4-diisocyanate (TDI) or methylene-4,4'-diphenylisocyanate (MDI), although the biurets show a somewhat greater structural variation.

The polyurethane elastomers and polyureas are formed by curing the urethane prepolymer or biuret, respectively. Curing is the reaction of the terminal isocyanate groups of the prepolymer or biuret with active hydrogens of a polyfunctional compound so as to form high polymers through chain extension and, in some cases, crosslinking. Diols, especially alkylene diols, are the most common curing agents, especially for MDI-based urethane prepolymers, and representing such diols with the structure HO—X—OH, where X is an organic moiety, most usually an alkylene group, the resulting polymer has as its repeating unit,

Where a triol or a higher polyhydric alcohol is used crosslinking occurs to afford a nonlinear polymer. Where biurets are the prepolymer crosslinking occurs even with diols, since the biuret itself is at least trifunctional.

Although other polyfunctional chemicals, especially diamines, are theoretically suitable as a curing agent, with but a few exceptions none have achieved commercial importance. The major exception is 4,4'-methylene-di-ortho-chloroaniline, usually referred to as MOCA, a curing agent which is both a chain extender and a crosslinker. TDI-based urethane prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material is be cast into molds. This property is conventionally referrec to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with some prepolymers as to afford a desirable pot life, hence the use of, for example, MOCA as a curing agent for TDI-based urethane prepolymers. However, MOCA and other of the aforementioned diamines still remain too reactive to be used, for example, with MDI-based urethane prepolymers.

Previously only primary aromatic diamines seem to have been used as curing agents. Presumably this is because secondary diamines were expected to have an unacceptably long pot life, and because they could act only as chain extenders with urethane prepolymers in contrast to the crosslinking capabilities of primary diamines. Recently, however, we have found that certain N,N'-dialkyl-4,4'-methylenedianilines are generally effective curing agents for a broad range of urethane prepolymers. The resulting polyurethanes often have the advantage of being thermoplastic rather than thermosetting, thereby making them especially useful as coatings, adhesives, and sealants. We also have found that such aromatic alkyl diamines are effective curing agents for biurets which, because of the latter's trifunctionality (and higher functionality), are crosslinked by these diamines to afford polyurea resins with quite desirable properties.

Polyurethanes find extensive application as coatings and adhesives. Among the properties of polyurethanes particularly desirable in the coating art are their chemical resistance, light stability, flexibility, toughness, weatherability, moisture resistance, abrasion resistance, gloss and color retention, and impact resistance. We have found that biuret prepolymers cured with the secondary amines we previously described afford resins which are particularly suitable as coatings, and this application is directed toward that use.

SUMMARY OF THE INVENTION

The object of this invention is to use particular polyureas as coatings and adhesives. An embodiment comprises the use of polyureas resulting from curing a diisocyanate-terminated biuret prepolymer with an aromatic alkyl diamine. In a more specific embodiment the alkyl is a secondary alkyl moiety. In a still more specific embodiment the biuret is that from 1,6-hexamethylene diisocyanate. Other embodiments will be apparent from the description which follows.

DESCRIPTION OF THE INVENTION

The invention herein is the use as coatings of polyureas resulting from curing a polyisocyanate which is at least trifunctional, especially a diisocyanate-terminated biuret prepolymer, with an aromatic alkyl diamine, especially those with a secondary alkyl moiety. It has been found that such polyureas have properties which lend themselves especially well do the coating art, hence these polyureas find particular application as coatings.

The isocyanates used in the practice of this invention are polyisocyanates which are at least triisocyanates. Prime examples of such polyisocyanates are the adducts of water and a diisocyanate in such a ratio as to give a biuret as the predominant product according to the equations written above. Thus, the biuret has the formula,

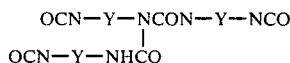

The structural unit Y is capable of great diversity, and in one commercially significant variant Y is a polymethylene moiety, $-(CH_2)_n-$, where n is an integer from 2 to about 10, with $n=6$ being especially important. In another variation Y is a divalent aromatic moiety, its completely saturated cyclic (cyclohexyl) counterpart, or a divalent aralkyl moiety. Examples of the resulting diisocyanates, OCN—Y—NCO, which may be used in the practice of this invention include phenylene diisocyanate, toluene diisocyanate, xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer including alkylated analogues such as 3,3'-dimethyl-4,4'-diphenylmethane diisocyanate; such hydrogenated materials as cyclohexylene diisocyanate, 4,4'-methylenedicyclohexyl diisocyanate; mixed aralkyl diisocyanates such as the tetramethylxylyl diisocyanates, $OCN-C(CH_3)_2-C_6H_4C(CH_3)_2NCO$, and the diisocyanate popularly referred to as isophorone diisocyanate, which is 3,3,5-trimethyl-5-isocyanatomethylcyclohexyl isocyanate; and polymethylene isocyanates as 1,4-tetramethylene diisocyanate, 1,5-pentamethylene diisocyanate, 1,6-hexamethylene diisocyanate, 1,7-heptamethylene diisocyanate, 2,2,4- and 2,4,4-trimethylhexamethylene diisocyanate, 1,10-decamethylene diisocyanate. The biuret prepolymers are adducts of 1 mole water to about 3 molar proportions of diisocyanate, with the proportions commonly ranging between 1:1 and about 1:6.

The polyurea elastomer is made by reacting the polyisocyanate with a secondary aromatic alkyl diamine of the structure.

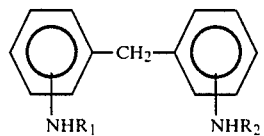

Each alkyl group, R, contains from 4 up to about 20 carbon atoms. Alkyl groups containing from 4 to 10 carbon atoms, and especially from 4 to about 8 carbon atoms, are particularly preferred. The alkyl group may be a primary, secondary, or tertiary alkyl group, although when the alkyl is tertiary there is the risk that cure time may be too long to be commercially acceptable. Secondary alkyl groups are preferred, and among these the secondary butyl group is particularly preferred. Of the positional isomers possible the 4,4'-methylenedianilines are most desirable.

Defining an equivalent of diamine as an amount which furnishes as many amino groups as there are isocyanate groups in the polyisocyanate or biuret prepolymer, from about 0.80 to about 1.2 equivalents of diamine are used in curing, with the range from about 0.85 to about 1.1 being the more usual one. Since each amino group has only one hydrogen, such secondary amines act by themselves only as a chain extender and not as a crosslinker. However, since the polyisocyanates are at least trifunctional the resulting polyurea will be extensively crosslinked. The curing mix may contain other materials, including polyols, in addition to, or partly replacing, the diamines of this invention. Where a polyol is present it typically will replace from about 5% to about 35% of the diamine. It is to be understood that such a curing mixture is contemplated as being within the scope of this invention.

The initial reaction between the polyisocyanate and the diamine is between about 75 deg and about 120 deg C. The temperature is chosen, in part, to afford a convenient pot life, that is, the time interval from mixing the diamine and polyisocyanate until the mixture is very difficult to pour. The elastomer is then cured to a tack-free state by heating at the same temperature range for an additional period from about 2 to about 24 hours.

The polyureas of this invention may be used as a coating for objects of metal, glass, wood, or plastic, for one feature of these polyureas is their ability to adhere strongly to a great variety of surfaces. Such versatility makes the materials of this invention particularly valuable.

The polyurea surface coatings described here may be applied as 1-pack or 2-pack systems. See R. Heath, Urethanes Technology, March, 1985, 17–20. In the 1-pack system the fully reacted polyurea is either in solution or is dispersed in a suitable medium. Examples of solvents which are suitable for use in the practice of this invention are aromatics generally, such as benzene, toluene, the xylenes, ethylbenzene, propylbenzene, and so forth; ketones, especially acetone and methylethylketone; and halogenated solvents such as chloroform, carbon tetrachloride, trichloroethylene, and so forth. The nature of the solvent is not particularly critical so long as it is unreactive with the polyurea, although a solvent which can be readily evaporated is desirable. The same attributes apply to the dispersing medium, where a suspension of the polyurea is used instead of a solution, with water often being a suitable dispersing medium.

The solution or dispersion of the polyurea may be applied to the surface of the object in any convenient way. Often such material is sprayed on a surface, although it may be painted on, the surface may be dip-coated, roller coated, and so on. Such methods of application are well known in the art and need not be elaborated upon further. After the coating has been applied the solvent or dispersing medium is evaporated, generally at a somewhat elevated temperature depending upon the nature of the solvent or dispersing medium. Generally, such temperatures do not exceed about 120 deg C.

In the 2-pack system a polyisocyanate and a suitable diamine are applied to a surface of the object, and the mixture is reacted or cured at an elevated temperature to form the polyurea. Conventionally, the polyisocyanate and the curing agent diamine are mixed immediately before applying to the surface of the object. However, it is possible to apply the polyisocyanate and the diamine separately. In either event, the final polyurea results from their reaction at elevated temperature, i.e., post-application curing is necessary. Curing occurs between about 75 deg and about 130 deg C., although higher temperatures may be employed if very short cure times are desired.

The example which follows is only illustrative of the invention, which is not to be limited thereby in any way.

Preparation of Polyurea Coatings. N,N'-di(2-butyl)-4,4'-methylenedianiline was mixed with acetic acid (0.05% based on total weight) and then mixed with Desmodur N-100 at different NCO indexes. Desmodur N-100 is an adduct of hexamethylene diisocyanate and water of equivalent weight 190, supplied by Mobay Chemical Co., and which is often used as an industry standard. Dry xylene was added to obtain a uniform solution with about 50% solids content. This transparent solution was coated on the clean aluminum panels using a doctor blade and baked at 130 deg C. for 30 minutes. A standard polyurea coating made from Desmodur N-100 and Desmophen 650A-65, a saturated polyester resin of equivalent weight 325 supplied by Mobay Chemical Co., was used as a control.

The sward and pencil hardness of the polyurea coatings were measured on a Sward Rocker and Brumbaugh pencil. The solvent resistance was determined on the surface of the polyurea coatings by using the double rub technique with MEK or xylene. The number of double rubs was recorded to express the solvent resistance properties. The impact resistance of the polyurea coatings was measured on a Gardner-SPI Modified Variable Height Impact Tester using both the direct and indirect techniques. The chemical resistance was measured by placing the panels with polyurea coating and wax (to protect the metal square) into a 10% NaOH or HCl solution at room temperature for one week. Any change of the surface (such as transparency, color and gloss, etc.) was recorded.

Table 1 summaries some properties of coatings prepared as previously described. The adduct (190 parts by weight) was mixed with different amounts (in parts by weight) of the secondary diamine to afford coatings of varying NCO/NH ratio. As shown there, the coating from N,N'-di(2-butyl)-4,4'-methylenedianiline with different NCO indexes exhibits better Gardner impact resistance and hardness than the control. The chemical resistance and the solvent resistance are the same as the control, except for the MEK solvent resistance properties.

TABLE 1

Properties of Polyurea Coatings Based on Desmodur N-100 With N,N'—di(2-butyl)-4'-methylenedianiline or Desmophen 650A-65

| Formulation | 1 | 2 | 3 | 4 |
|---|---|---|---|---|
| Desmodur N-100 | 190 | 190 | 190 | 190 |
| Unilink 450 | 175.8 | 158.2 | 143.8 | — |
| Desmophen 650A-65[1] | — | — | — | 325 |
| Dibutyltin dilaurate (0.05%)[2] | — | — | — | 0.26 |
| Acetic acid (0.05%)[2] | 0.18 | 0.17 | 0.17 | — |
| Xylene (50%)[2] | 183 | 174 | 167 | — |
| Ethyl acetate (50%) | — | — | — | 288 |
| NCO/NH | 0.9 | 1.0 | 1.1 | — |
| NCO/OH | — | — | — | 1.0 |
| Baking condition, min./°C. | 30/130 | 30/130 | 30/130 | 30/130 |
| Hardness | | | | |
| Sward | 30 | 26 | 16 | 10 |
| Pencil | HB | HB | HB | HB-B |
| Gardner Impact | | | | |
| Direct, lb. in. | 140 | 140 | 140 | 140 |
| Indirect, lb. in. | 140 | 120 | 140 | 80 |
| Solvent resistance[3] | | | | |
| MEK | Pass/70 | Pass/70 | Pass/50 | Pass/100 |
| Xylene | Pass/100 | Pass/100 | Pass/100 | Pass/100 |
| Chemical resistance[4] | | | | |
| 10% HCl × RT × One Week | Pass | Pass | Pass | Pass |
| 10% NaOH × RT × One Week | Pass | Pass | Pass | Pass |
| Thickness, mils | 6 | 5 | 10 | 10 |

[1] A viscous, saturated polyester resin supplied by Mobay Chemical Co. as a 65% solution in ethyl glycol acetate, eq. wt. = 325, solids % = 65.
[2] Based on solids content.
[3] Using double rub with solvent, and the number of double rubs without damage to the surface were recorded.
[4] The surface did not change after immersing in 10% HCl or NaOH for one week at room temperature.

What is claimed is:

1. A method of coating an object of metal, glass, wood, or plastic comprising applying to a surface of the object a solution or dispersion of a polyurea resulting from the reaction of a polyisocyanate having at least three isocyanate moieties with from about 0.8 to about 1.2 equivalents of a secondary aromatic diamine of the structure,

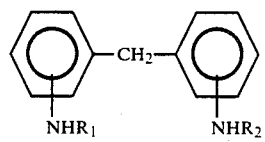

where each alkyl group, $R_1$ and $R_2$, contains from 4 to about 20 carbon atoms, and evaporating the solvent or dispersing medium.

2. The method of claim 1 wherein the polyisocyanate is a biuret of the structure,

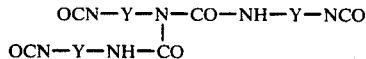

where Y is:
a. a polymethylene chain, $-(CH_2)_n-$, with n being an integer from 2 to about 10; or b. a divalent aromatic radical; or
c. a divalent cyclohexyl radical; or
d. a divalent aralkyl radical.

3. The method of claim 2 where Y is a hexamethylene moiety.

4. The method of claim 2 where the diisocyanate precursor of the biuret is an aromatic diisocyanate selected from the group consisting of phenylene, toluene, xylene, naphthalene, methylenediphenyl, and 3,3'-dimethyldiphenylmethane diisocyanate.

5. The method of claim 2 where the diisocyanate precursor of the biuret is a cyclohexyl diisocyanate selected from the group consisting of cyclohexyl, methylcyclohexyl, and methylenedicyclohexyl diisocyanate.

6. The method of claim 2 where the diisocyanate precursor of the biuret is a diisocyanate which is tetramethylxylyl and isophorone diisocyanate.

7. The method of claim 1 where the alkyl group contains from 4 to about 10 carbon atoms.

8. The method of claim 7 where the alkyl group contains from 4 to 8 carbon atoms.

9. The method of claim 1 where the alkyl is a secondary alkyl moiety.

10. The method of claim 1 where the alkyl group is the 2-butyl group.

11. The method of claim 1 where the diamine is a N,N'-dialkyl-4,4'-methylenedianiline.

12. The method of claim 11 where the diamine is N,N'-di(2-butyl)-4,4'-methylenedianiline.

13. The method of claim 1 where from about 5% to about 35% of the diamine is replaced by a polyol.

14. A method of coating an object of metal, glass, wood, or plastic comprising applying to a surface of the object a polyisocyanate having at least three isocyanate moieties and from about 0.8 to about 1.2 equivalents of a secondary aromatic diamine of the structure,

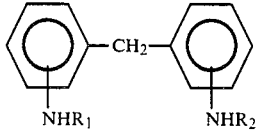

where each alkyl group, $R_1$ and $R_2$, contains from 4 to about 20 carbon atoms, and reacting the prepolymer with the diamine at a temperature from about 75° to about 130° C. so as to form a polyurea on said surface.

15. The method of claim 14 where the polyisocyanate is a biuret of the structure,

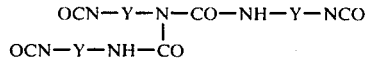

where Y is:
a. a polymethylene chain, $-(CH_2)_n-$, with n being an integer from 2 to about 10; or
b. a divalent aromatic radical; or
c. a divalent cyclohexyl radical; or
d. a divalent aralkyl radical.

16. The method of claim 15 where Y is a hexamethylene moiety.

17. The method of claim 15 where the diisocyanate precursor of the biuret is an aromatic diisocyanate selected from the group consisting of phenylene, toluene, xylene, naphthalene, methylenediphenyl, and 3,3'-dimethyldiphenylmethane diisocyanate.

18. The method of claim 15 where the diisocyanate precursor of the biuret is a cyclohexyl diisocyanate selected from the group consisting of cyclohexyl, methylcyclohexyl, and methylenedicyclohexyl diisocyanate.

19. The method of claim 15 where the diisocyanate precursor of the biuret is a diisocyanate which is tetramethylxylyl or isophorone diisocyanate.

20. The method of claim 11 where the alkyl group contains from 4 to about 10 carbon atoms.

21. The method of claim 20 where the alkyl group contains from 4 to 8 carbon atoms.

22. The method of claim 11 where the alkyl is a secondary alkyl moiety.

23. The method of claim 11 where the alkyl group is the 2-butyl group.

24. The method of claim 11 where the diamine is a N,N'-dialkyl-4,4'-methylenedianiline.

25. The method of claim 24 where the diamine is N,N'-di(2-butyl)-4,4'-methylenedianiline.

26. The method of claim 11 where from about 5% to about 35% of the diamine is replaced by a polyol.

27. The method of claim 11 where the temperature is from about 75° to about 130° C.

* * * * *